March 21, 1933.  A. H. LEIPERT  1,902,712
CHAIN DRIVE
Filed July 22, 1931  2 Sheets-Sheet 1

INVENTOR
August H. Leipert,
BY
HIS ATTORNEYS

March 21, 1933.  A. H. LEIPERT  1,902,712
CHAIN DRIVE
Filed July 22, 1931   2 Sheets-Sheet 2

INVENTOR
August H. Leipert,
BY
Redding, Greeley, O'Shea & Campbell
HIS ATTORNEYS Patented Mar. 21, 1933

1,902,712

UNITED STATES PATENT OFFICE

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE

CHAIN DRIVE

Application filed July 22, 1931. Serial No. 552,361.

The present invention relates to drives for motor vehicles and embodies, more specifically, an improved drive for the type of vehicle embodying individually sprung wheels. In this type of vehicle there are no unsprung through axles and each wheel is individually mounted and driven by suitable mechanism carried by the chassis. Various mounting devices and spring assemblies have been provided for drives of this character and considerable difficulty has been experienced in providing a drive which is sufficiently strong to transmit the necessary driving torque and at the same time yielding to accommodate various positions of the wheels without impairing the driving power thereof.

With a view to providing a suspension and driving mechanism which affords the desired strength and flexibility, the present invention has been designed and an object thereof is to provided a suspension and drive for wheels of the above character wherein the parts are simple in construction and few in number, the construction being of such character as to be readily assembled and dismounted for inspection and repair.

A further object of the invention is to provide a device of the above character, wherein the parts may yield to accommodate variations of the position of the wheels.

Further objects, not specifically enumerated above, will be apparent as the invention is described in greater detail in connection with the accompanying drawings, wherein.

Figure 1:
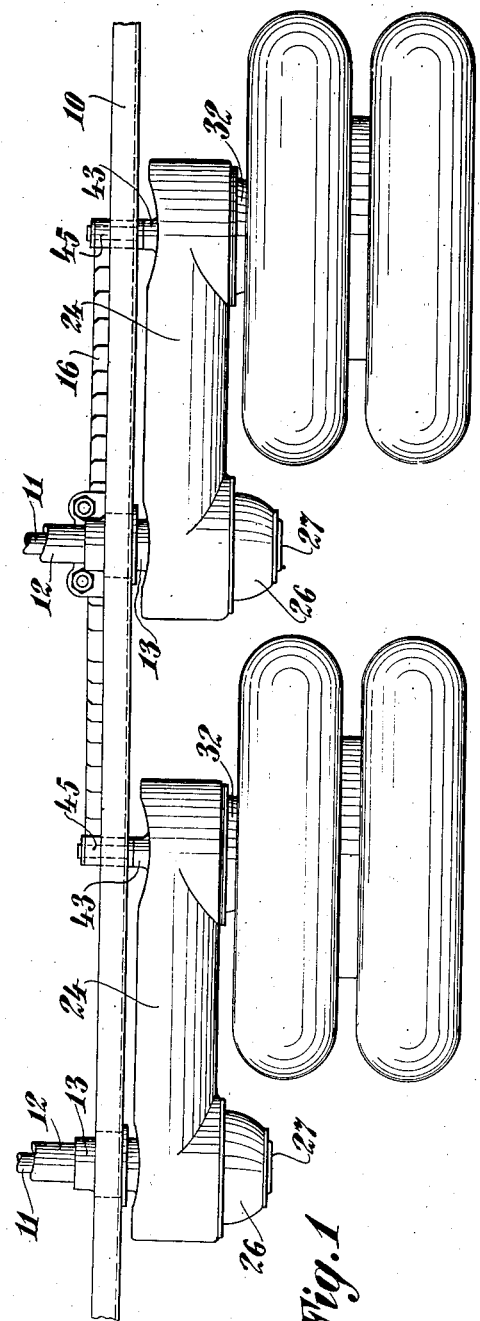
Figure 1 is a plan view of a portion of a vehicle chassis constructed in accordance with the present invention and provided with two individual wheel mountings.
Figure 2:
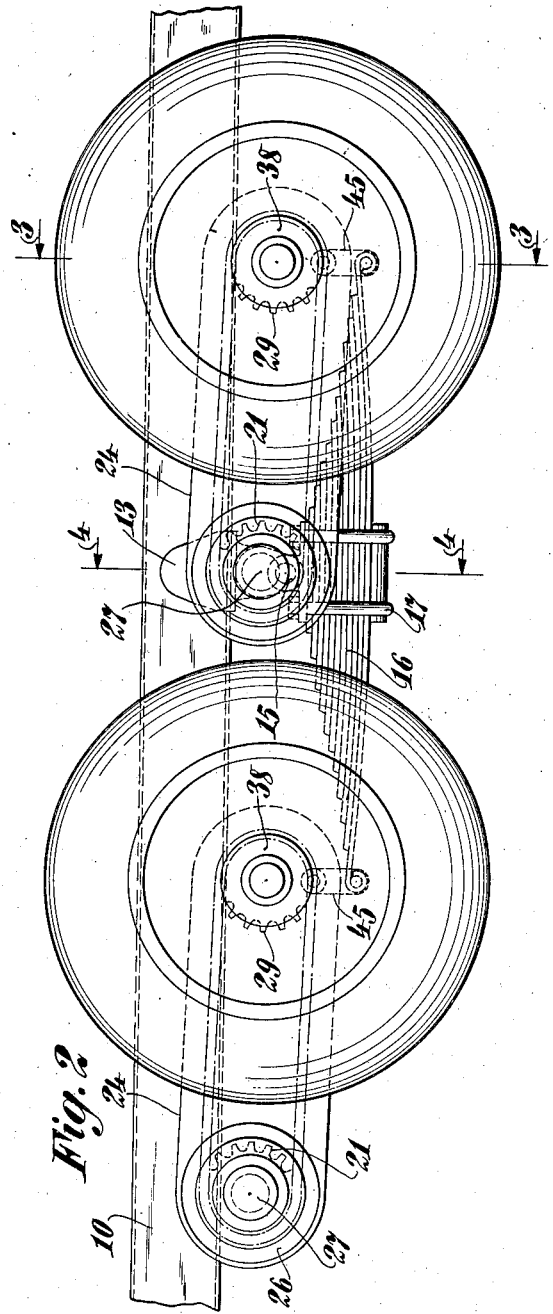
Figure 2 is a view in side elevation, showing the construction of Figure 1.
Figure 3:
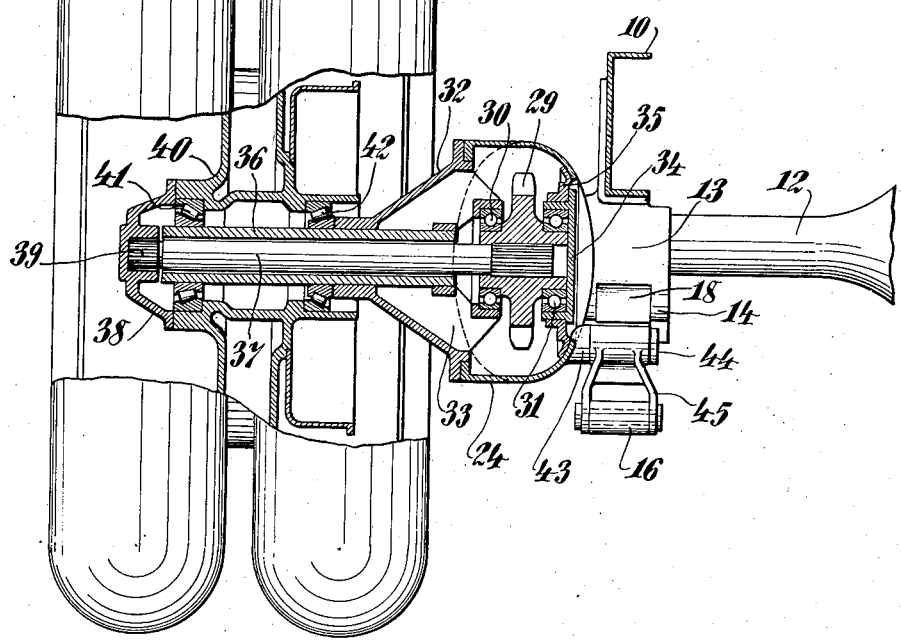
Figure 3 is a view in section, taken on line 3—3 of Figure 2, and looking in the direction of the arrows.
Figure 4:
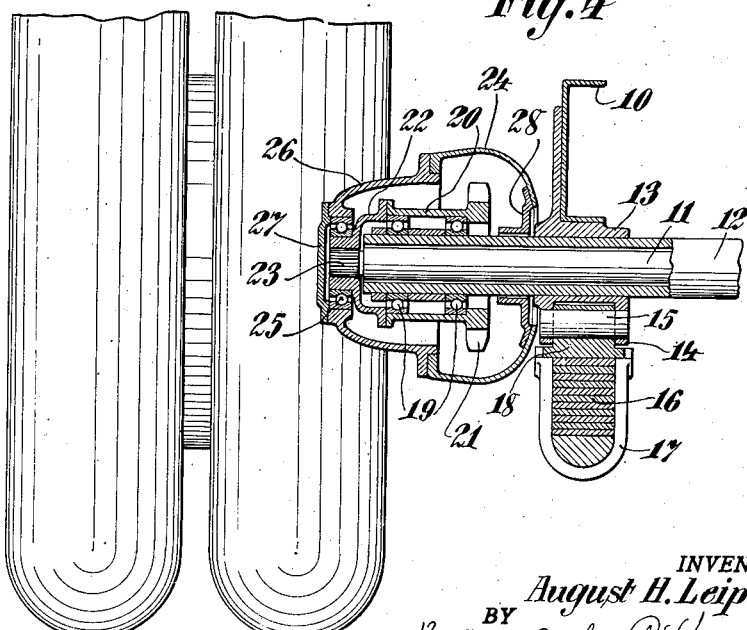
Figure 4 is a view in section, taken on line 4—4 of Figure 2, and looking in the direction of the arrows.

Referring to the above drawings, a portion of a frame of a motor vehicle is shown at 10 upon which a plurality of jack shafts 11 are mounted. Suitable jack shaft housings 12 enclose the jack shafts and are mounted in brackets 13, as clearly shown in Figure 4. The brackets 13 are secured to the frame member 10 in any desired fashion and, where the vehicle includes two individual wheel mountings in tandem, it is found especially convenient to provide the rear bracket 13 with depending spaced lugs 14 which receive a journal pin 15 upon which a spring 16 is mounted by means of a suitable clip 17 and bracket 18.

Spring 16 thus extends forwardly and rearwardly from the rear jack shaft housing 12 and provides an underslung spring suspension of the character described hereinafter.

Upon each housing 12, spaced bearings 19 are mounted, sleeves 20 being journaled thereon. The sleeves 20 are provided with driving sprocket teeth 21 and connected to the respective jack shafts 11 through spiders 22 which are splined to an extension 23 on the jack shafts 11.

Hollow pressed steel crank arms 24 are provided and are journaled upon the housings 12 through the sleeves 20, spiders 22 and journals 25 in order that they may swing about the axes of the jack shafts 11. Covers 26 enclose the open ends of the crank arms and plates 27 afford easy access to the interior of the covers 26 and the upper extremities of the crank arms 24. Closure plates 28 are carried by the housings 12 and serve as a convenient means for closing the upper extremities of the crank arms adjacent the frame of the vehicle.

Within the lower extremities of the crank arms 24, driven sprockets 29 are journaled by means of bearings 30 and 31. Closures 32 are mounted upon one side of the crank arms and are formed with inwardly extending webs 33 upon which bearings 30 are mounted Bearings 31 are carried in caps 34 and annular members 35 seal the space between the caps 34 and the adjacent curved portions of the crank arms 24

Housings 36 are mounted in the closure 32 and receive shaft sections 37 which are splined to the driven sprockets 29 at one end and spiders 38 at the other end by means of splined extensions 39. Spiders 38 are secured to the hubs 40 of wheels which are journaled upon the housings 36 by means of bearings 41 and 42. Shoulders 43 are formed adjacent the outer extremities of the cranks and carry pins 44 to which shackles 45 are connected. The ends of spring 16 are secured to the shackles 45 and thus the vehicle is suspended directly upon the wheel housing ends of the crank arms 24. The weight carrying elements are floated in relation to the driving elements and the resulting structure is of great strength and flexibility of drive. The crank arm is constructed of pressed steel with an elliptical section in order to house a chain between the driving and driven sprockets and to afford the strongest section of metal to carry the torque imposed by the load on the wheels.

While the invention has been described with specific refernce to the accompanying drawings, it is not to be limited, save as defined in the appended claims.

I claim as my invention:

1. A drive for a wheel mounted independently on a vehicle frame comprising a hollow crank arm for mounting a wheel and having apertures spaced upon opposite sides at one end thereof, a driving shaft on the frame projecting into the crank arm, a housing for the shaft secured to the frame, a sleeve journaled on the housing in the crank arm, a spider secured to the sleeve and splined to the shaft, and means to journal the arm on the spider.

2. A drive for a wheel mounted independently on a vehicle frame comprising a hollow crank arm for mounting a wheel and having apertures spaced upon opposite sides at one end thereof, a driving shaft on the frame projecting into the crank arm, a housing for the shaft secured to the frame, a sleeve journaled on the housing in the crank arm, a spider secured to the sleeve and splined to the shaft, a cover for one of the apertures secured to the arm, and means to journal the cover on the spider.

3. A drive for a wheel mounted independently on a vehicle frame comprising a hollow crank arm for mounting a wheel, means to journal the arm on the frame, a wheel driving shaft, a housing for the last named shaft carried by the arm, a cover for the arm, means to mount the housing in the cover, webs on the cover, aligned bearings carried by the webs and the arm, means to journal the shaft in the bearings, a wheel hub journaled on the housing, and means to transmit driving forces from the shaft to the hub.

4. A drive for a wheel mounted independently on a vehicle frame comprising a hollow crank arm for mounting a wheel, means to journal the arm on the frame, a wheel driving shaft, a housing for the last named shaft carried by the arm, a cover for the arm, means to mount the housing in the cover, webs on the cover, aligned bearings carried by the webs and the arm, a driven sprocket carried by one end of the shaft and journaled in the bearings, a wheel hub journaled on the housing, and means to transmit driving forces between the other end of the shaft and the hub.

5. In combination with two crank arms mounted independently to trail in tandem on a vehicle frame, wheels journaled thereon, and driving means in the arms, a spring pivotally mounted on the frame between the wheels and upon one of the crank arm mounting means, and shackle connections between the ends of the spring and the ends of the arms.

6. In combination with two independently mounted crank arms, means to journal one of the ends of each arm on one side of a vehicle frame in tandem relationship, wheels journaled on the other ends of the arms, a spring journaled intermediate its ends on the means for mounting the rear arm on the frame, and means to connect the ends of the spring to the ends of the arms distant from the connection thereof to the frame.

This specification signed this 13th day of July A. D. 1931.

AUGUST H. LEIPERT.